United States Patent Office 3,460,280
Patented Aug. 12, 1969

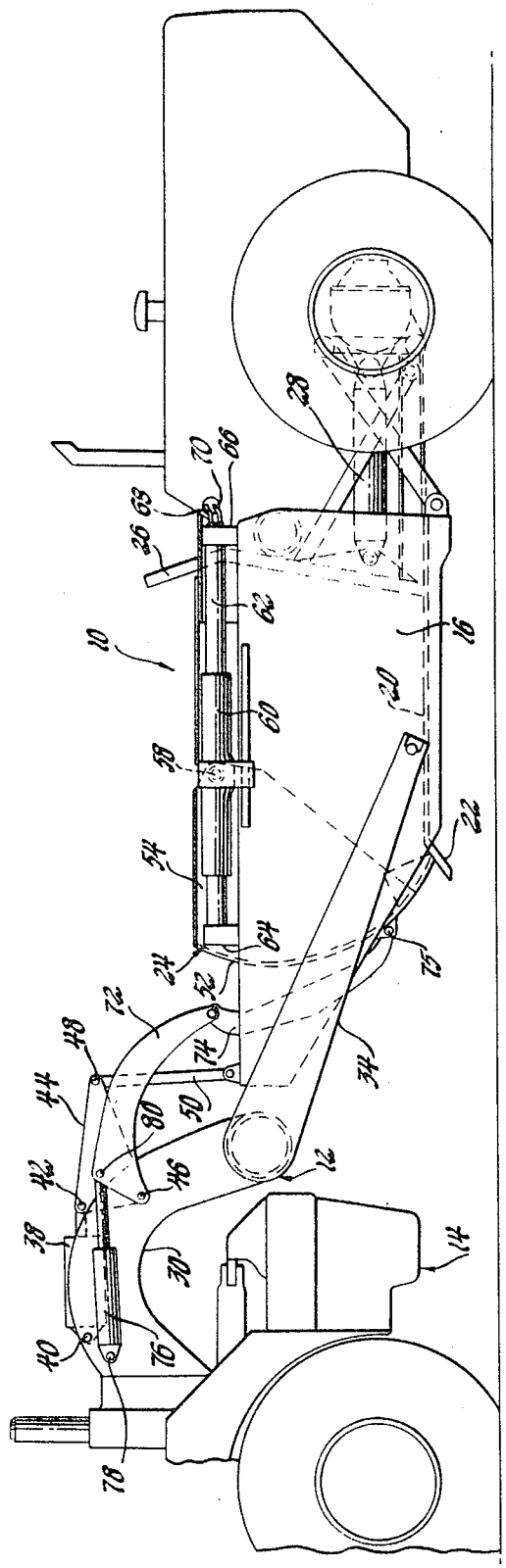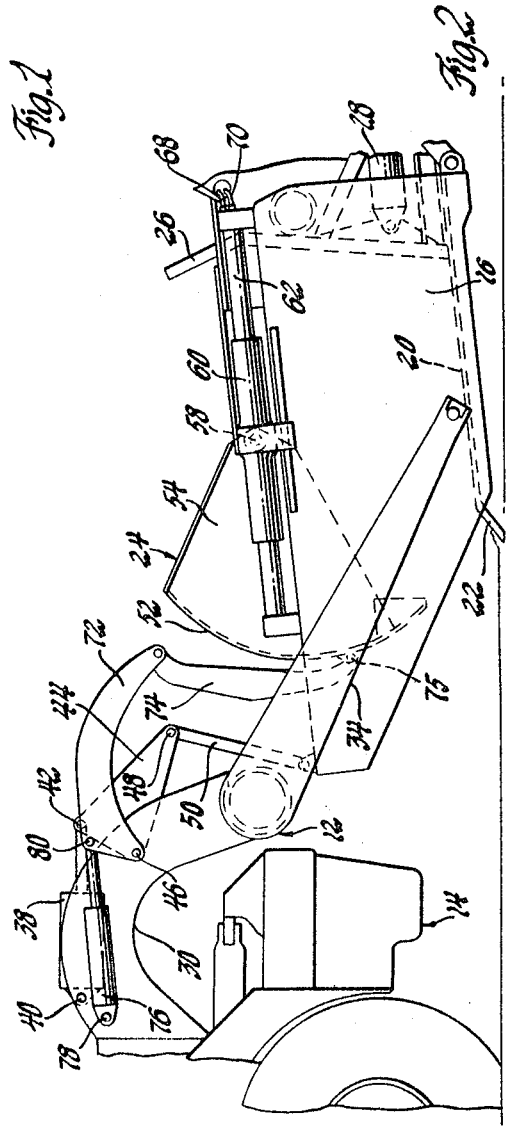

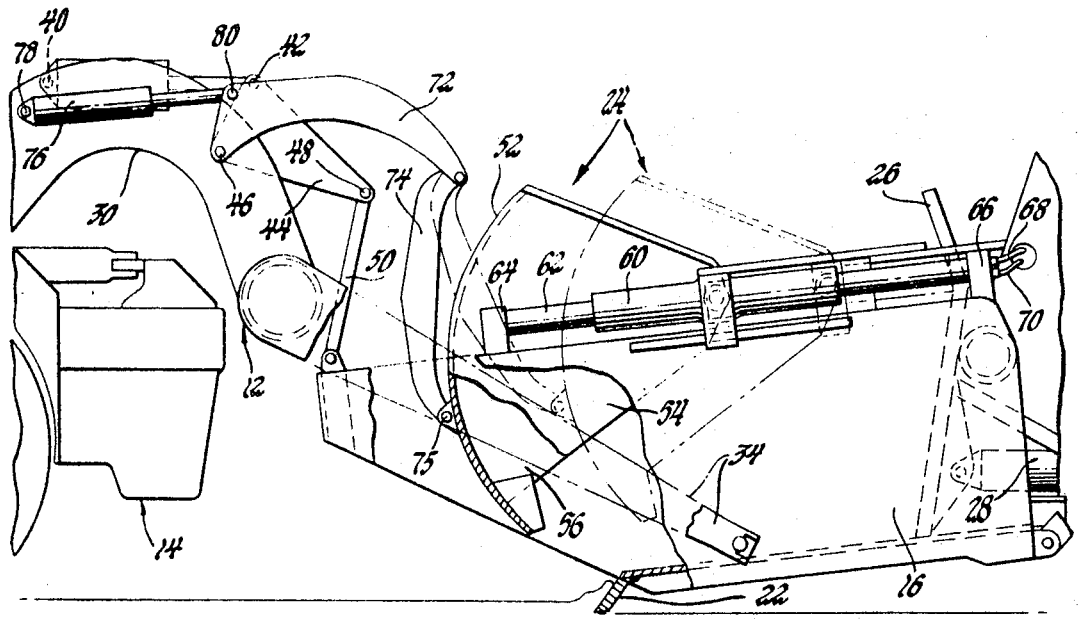

3,460,280
PULL-IN APRON FOR A SCRAPER
Robert R. Batson, Pepper Pike, and Russell C. Williams, Rocky River, Ohio, assignors to General Motors Corporation, Detroit, Mich., a corporation of Delaware
Filed June 7, 1967, Ser. No. 644,130
Int. Cl. E02f; B60p 1/00, 1/04
U.S. Cl. 37—4                                                4 Claims

ABSTRACT OF THE DISCLOSURE

A scraper apron that serves to retain material within the bowl and also functions to facilitate loading thereof. The apron is connected to the side walls of the bowl by transversely aligned pivotal connections which are adapted to be moved rearwardly so that the apron will scoop material into the bowl during a loading operation.

---

It has been previously proposed to use the apron of a scraper as an auxiliary loading implement in order to aid in the loading of the bowl as well as to conserve the power requirements of the prime mover. One example of an apron loading device of this type can be seen in U.S. Patent 3,006,088, issued to J. M. Layton, and assigned to the assignee of this invention. It will be noted that the latter-mentioned device has the apron supported by a pair of laterally spaced arms, each of which is pivotally connected at the rear end to a bowl side wall, while the front end is pivotally connected to the apron. A fluid operated jack extends between the bowl side wall and a point on the apron spaced above the axis of pivotal connection of the apron to the support arm so that upon actuation of the jack the apron may be pivotally adjusted relative to the support arms and thereby provide a sweeping action for propelling materials adjacent the cutting edge into the bowl.

This invention concerns an apron mechanism which is similar in basic concept to the above-described device but differs therefrom primarily in its ability to translate the apron rearwardly into the bowl along a straight line path while maintaining the apron substantially at a fixed angle with respect to the floor of the bowl. Thus, material piling up in front of the cutting edge can be moved to the rear of the bowl and thereby provide room for additional loading of the bowl.

Accordingly, the main objectives of the present invention are to provide a self-loading scraper having an apron, the lower portion of which is vertically adjustable and movable rearwardly into the bowl for facilitating loading of the material therein; to provide an apron for a scraper that is capable of assuming the normal function of an apron, such as retaining material within the bowl, as well as serving as a scoop which moves material at the cutting edge toward the rear of the bowl; and to provide an apron that is connected to a scraper bowl by a pivotal connection that is movable rearwardly through power operated means so as to cause the apron to be drawn into the bowl and thereby provide more efficient loading thereof.

Other objects, advantages, and features of the present invention will be more apparent from the following detailed description when taken with the drawings in which:

FIGURE 1 is an elevation view of a scraper bowl incorporating an apron mechanism made in accordance with the invention;

FIGURE 2 is a partial view of the scraper of FIGURE 1 and shows the position of the bowl and apron during a digging operation;

FIGURE 3 is an enlarged view similar to FIGURE 2 and shows two positions of the apron during a loading operation, and FIGURE 4 is an enlarged plan view of the bowl portion of the scraper shown in FIGURE 1.

Referring to the drawings and more particularly FIGURES 1 and 4 thereof, a wheeled scraper bowl 10 is shown having the forward end thereof supported by the usual pull yoke 12 which in turn is mounted on an overhung tractor 14, the rear portion of which is only shown. The scraper bowl 10 comprises a pair of upstanding and laterally spaced side walls 16 and 18, the lower ends of which are interconnected by a transversely extending floor 20 terminating with a cutting blade 22. The front or open end of the bowl 10 is adapted to be closed by an apron 24, while the rear of the bowl supports an ejector plate 26 which is adapted to be moved forwardly by a hydraulic cylinder 28 for discharging a load.

The scraper bowl 10 is supported for movement between a raised-carry position, shown in FIGURE 1, and a lowered-dig position, shown in FIGURE 2, by the pull yoke 12 which comprises a gooseneck 30 rigidly connected to a transverse torque tube 32, the opposite ends of which fixedly support pull arms 34 and 36 that extend rearwardly for pivotal connection with the side walls 16 and 18 of the bowl. Movement of the bowl 10 between the aforementioned positions is realized through a bowl operating mechanism consisting of a hydraulic cylinder 38, one end of which is pivotally connected to the gooseneck 30 by a pivotal connection 40. The other end of the hydraulic cylinder 38 is pivotally connected at a point 42 to a bellcrank 44, which, in turn, is pivotally supported at point 46 on the gooseneck 30 and has the rear portion thereof at point 48 pivotally connected to the front of the bowl by a depending link 50. Thus, upon contraction of the hydraulic cylinder 38, the bowl 10 is moved to the position of FIGURE 1, while expansion of the cylinder 38 permits the bowl 10 to drop either by power or gravity to the dig position of FIGURE 2.

As is well known, during a normal scraper-digging operation, the bowl is lowered until the cutting blade reaches the desired depth of cut. As the scraper proceeds through the cut, dirt is loosened by the cutting blade and forced into the bowl by the forward motion of the unit. In the first portion of the dig cycle, the dirt flows rather easily into the bowl; however, as the bowl begins to fill, the material begins to pile up in front of the cutting edge resulting in not only less rapid filling of the bowl, but also increased resistance to forward movement of the scraper unit, and, therefore, an increase in power requirements.

The apron 24 and the associated operating mechanism made in accordance with this invention is intended to alleviate the above-mentioned problem in scraper loading by pushing the material at the cutting blade into the rear of the bowl thereby providing additional room for further loading. In this connection, it will be noted that the apron 24 is formed with an arcuately-shaped forward wall 52, the opposite sides of which are provided with triangularly-shaped and rearwardly extending side walls 54 and 56. The apex of each side wall 54 and 56 is connected by a pivotal connection 58 to a cylinder member 60 which is the movable portion of an actuator or double-ended hydraulic jack. The opposite ends of the cylinder member 60 are supported for movement along a longitudinally extending piston member which includes a rod 62 secured by posts 64 and 66 to the associated side wall of the scraper bowl 10. Although not shown, a piston head is rigidly formed with the rod 62 at an intermediate portion thereof and serves to divide the interior of the cylinder member 60 into two expandable chambers located fore and aft of the pivotal connection 58. Conduits 68 and 70 connect with suitable passages and ports, not shown, which communicate with each of the chambers in the cylinder 60. It will be understood that each conduit can be utilized for either pressurizing or venting one of the chambers so when it is desired to move the cylinder member 60 toward the rear of the bowl, as seen in FIGURE 3, pressurized fluid is directed through the conduit communicating with the rear chamber of the cylinder member 60, and the fluid in the front chamber is vented by means of the other conduit. In contradistinction, when the cylinder member 60 is to be moved toward the front of the bowl, the conduit connecting with the front chamber of the cylinder member 60 is supplied with pressurized fluid, while the conduit leading to the rear chamber is vented. Double-ended hydraulic jacks of this type, as well as the fluid directional control valve required for operating the same, are well known to those skilled in the art and, therefore, further discussion of these components is not deemed to be necessary.

As should be apparent from the above, the movement of the cylinder members 60 both forwardly and rearwardly is coordinated so that the apron 24 moves as a unit in the corresponding direction. In addition, the reciprocating capability of the apron 24 is augmented by a vertical adjustment which is provided through a pair of identical linkages comprising pivotally interconnected link members 72 and 74 which extend between a pivot point 75 on the wall 52 of the apron 24 and the gooseneck 30 of the pull yoke 12. A double-acting hydraulic cylinder 76 is incorporated with each linkage and is pivotally connected to the gooseneck 30 at 78 and to the link 72 at 80 for obtaining the controlled vertical adjustment of the apron 24. Each link 72 is carried by the gooseneck for pivotal movement about an axis which coincides with the axis of pivot point 46.

Accordingly, as aforementioned, when the material piles in front of the cutting blade 22, the apron 24 can be adjusted to a predetermined height with respect to the cutting blade by coordinated actuation of the hydraulic cylinders 76. Thereafter, the double-ended hydraulic jacks are energized in the aforementioned manner causing the apron 24 to be moved rearwardly along a straight line path, as seen in FIGURE 3, so as to cause the apron to act as a scoop and move the material at the cutting blade toward the rear of the bowl 10. This action is repeated until the bowl 10 is filled whereafter the apron 24 may be moved to the closed position of FIGURE 1 to retain the material within the bowl, while the load is being transported to the fill area. As the scraper approaches the fill area, the bowl is lowered by expanding cylinder 38 until the scraper blade is at a correct distance above the ground to give the desired depth of fill. Thereafter, the apron 24 can be raised to a position where it is able to clear the load being dumped and the ejector 26 is moved forwardly to complete the dumping of the load.

Various changes and modifications can be made in this construction without departing from the spirit of the invention. Such changes and modifications are contemplated by the inventors and they do not wish to be limited except by the scope of the appended claims.

We claim:
1. A scraper including a tractor and a trailing bowl, a draft frame connecting the tractor to said bowl and supporting the latter between a lowered-dig position and a raised-carry position, said bowl having an open front defined by a pair of laterally spaced side walls and a transversely extending floor, an apron adapted to close the open front of the bowl and retain material in the latter, pivotal connections adjacent said side walls supporting said apron for pivotal movement about a transverse horizontal axis, means supported by said draft frame and connected to said apron adjacent the lower end thereof for adjustably positioning the apron about said axis relative to the floor, and hydraulic cylinder means rigidly carried by each of said walls along an axis extending longitudinally of the bowl and substantially parallel to the floor for supporting said pivotal connections and providing for reciprocal movement thereof along said axis so that said apron will facilitate loading of the bowl.

2. The scraper of claim 1 wherein said means connected to said apron for adjustably positioning the latter includes a linkage extending between said draft frame and said apron, and a power operated actuator carried by said draft frame and connected to said linkage for moving said apron about said transverse horizontal axis.

3. A scraper including a tractor and a trailing bowl, a draft frame connecting the tractor to said bowl and supporting the latter between a lowered-dig position and a raised-carry position, said bowl having an open front defined by a pair of laterally spaced side walls and a transversely extending floor, an apron adapted to close the open front of the bowl and retain material in the latter, transversely aligned pivotal connections adjacent said side walls supporting said apron for pivotal movement about a transverse horizontal axis, means supported by said draft frame and connected to said apron for adjustably positioning the apron about said transverse horizontal axis relative to the floor, actuator means carried by each of said side walls for reciprocating said apron during a loading operation and thereby facilitating loading of the bowl, said actuator means including relatively movable cylinder and piston members, said piston member comprising an elongated rod rigidly secured to the associated side wall along an axis extending longitudinally of the bowl and substantially parallel to the floor, and said cylinder member being carried by said piston member and supporting said pivotal connections at an intermediate portion thereof.

4. A scraper including a tractor and a trailing bowl a draft frame connecting the tractor to said bowl and supporting the latter between a lower-dig position and a raised-carry position, said bowl having an open front defined by a pair of laterally spaced side walls and a transversely extending floor, an apron adapted to close the open front of the bowl and retain material in the latter, transversely aligned pivotal connections adjacent said side walls supporting said apron for pivotal movement about a transverse horizontal axis, means supported by said draft frame and connected to said apron adjacent the lower end thereof for adjustably positioning the apron about said transverse horizontal axis relative to the floor, actuator means carried by each of said side walls for reciprocating said apron during a loading operation and thereby facilitating loading of the bowl, said actuator means including relatively movable cylinder and piston members, said piston member comprising an elongated rod having the opposed ends thereof rigidly secured to the associated side wall along an axis extending longitudinally of the bowl and substantially parallel to the floor, and said cylinder member being carried by said piston member and supporting said pivotal connections at an intermediate portion thereof.

References Cited

UNITED STATES PATENTS

| | | |
|---|---|---|
| 2,396,287 | 3/1946 | Robb. |
| 2,411,280 | 11/1946 | Lichtenberg et al. |
| 2,679,119 | 5/1954 | Robb. |
| 3,313,050 | 4/1967 | Junck et al. _____ 37—129 |

ROBERT E. PULFREY, Primary Examiner

EUGENE H. EICKHOLT, Assistant Examiner

U.S. Cl. X.R.

37—129; 214—501